United States Patent [19]
Feldermann

[11] Patent Number: 5,944,507
[45] Date of Patent: Aug. 31, 1999

[54] OXY/OIL SWIRL BURNER

[75] Inventor: Christian J. Feldermann, Sheffield, United Kingdom

[73] Assignee: The BOC Group plc, Windlesham, United Kingdom

[21] Appl. No.: 09/062,367

[22] Filed: Apr. 17, 1998

[30] Foreign Application Priority Data

May 7, 1997 [GB] United Kingdom ................... 9709205

[51] Int. Cl.⁶ ............................... F23C 5/06; F23C 5/00; B05B 7/06
[52] U.S. Cl. .................. 431/189; 431/181; 431/187; 431/185; 431/115; 431/8; 431/9; 431/10; 431/351; 431/353; 239/424; 239/399; 239/428
[58] Field of Search .................. 431/189, 181, 431/187, 159, 182, 183, 185, 350, 351, 353, 115, 116, 8, 9, 10, 12; 239/423, 424, 424.5, 428, 399, 400, 430

[56] References Cited

U.S. PATENT DOCUMENTS

| | | | |
|---|---|---|---|
| 2,363,942 | 11/1944 | Campbell | 431/181 |
| 3,022,815 | 2/1962 | Bloom et al. | 431/185 |
| 3,285,240 | 11/1966 | Schmidt | 431/353 |
| 3,685,740 | 8/1972 | Shepherd | 431/351 |
| 4,203,717 | 5/1980 | Facco et al. | 431/189 |
| 4,475,885 | 10/1984 | Finke | 239/428 |
| 4,622,007 | 11/1986 | Gitman | 239/423 |
| 5,062,789 | 11/1991 | Gitman | 431/9 |
| 5,393,220 | 2/1995 | Couwels et al. | 431/187 |
| 5,542,839 | 8/1996 | Kelly | 431/181 |

*Primary Examiner*—Ira S. Lazarus
*Assistant Examiner*—Josiah C. Cocks
*Attorney, Agent, or Firm*—William A. Schoneman; Salvatore P. Pace

[57] ABSTRACT

A liquid fuel burner is provided with a central fuel outlet having a generally divergent conical inner surface, formed of two contiguous divergent conical surfaces of different angles of divergence, and a plurality of oxygen outlets shaped and positioned for creating a converging, rotating stream of oxygen which intersects with any liquid fuel issuing from the fuel outlet. Such oxygen/fuel interaction results in two zones of combustion and a recirculation effect which assists in the complete or substantially complete combustion of undesirable exhaust gas components. The oxygen and fuel are preferably supplied such that their velocities are approximately equal at the point at which the two zones of combustion meet.

20 Claims, 4 Drawing Sheets

OXY/OIL SWIRL BURNER

The present invention relates to a burner for combusting a liquid fuel and relates particularly, but not exclusively, to an oil burner having low $NO_x$ emission and one employing a swirling technique to assist with complete or substantially complete combustion.

BACKGROUND OF THE INVENTION

U.S. Pat. No. 3,685,740 discloses an oxygen-fuel burner of the rocket burner type comprising a cylindrical combustion chamber having an open discharge end and a burner plate with separate oxygen and fuel ports constituting the opposite end of the chamber. The projected longitudinal axis of the oxygen ports extend in converging directions towards the longitudinal axis of the chamber, but are in off-set, non-intersecting relation thereto, so that points on the respective axes that most closely approach the chamber axes define a transversely positioned plane between the burner plate and the chamber exhaust. The projected longitudinal axes of the fuel ports are substantially parallel to the chamber axes for mixing of oxygen and fuel at and beyond the plane of closest approach. Means are provided for adjusting the longitudinal position of the burner plates on the chamber axes and thereby locating the plane of closest approach in relation to the chamber exhaust for determining the pattern of the burner discharge flame. Such a burner also includes a cooling water jacket which extends towards the tip of the burner thereby to cool said tip during operation of the burner. Whilst this burner is capable of producing a number of different flame patterns, these patterns tend to be turbulent and, therefore, are not suitable for certain applications. It is also noted that this burner is designed for complete mixing of the oxygen/fuel so that hot fully combusted flame gases will leave the burner. Consequently, the tip of the burner will require cooling and hence the overall burner efficiency will be reduced as part of the combustion will be lost to the cooling fluid in the cooling jacket. Additionally, this burner is comparatively noisy and, whilst it produces lower harmful emissions such as $NO_x$ than other conventional burners, such as the so called "tube-in-tube" burners, because of the oxygen/fuel mixing method it employs these emissions are still sufficient to cause concern. In accordance with the present invention, there is provided a liquid fuel burner which reduces and possibly eliminates the problems associated with the above mentioned arrangement.

SUMMARY OF THE INVENTION

The present invention provides a burner and method of using the same for combusting oxygen and a liquid fuel, the burner having an outer jacket comprising a first inlet end, a second outlet end for combustion flame discharge and defining a combustion chamber and a longitudinal axis X; fuel supply means for introducing a stream of atomized fuel into the inlet end and directing it towards the outlet end, and oxygen supply means for introducing oxygen into the inlet end and for directing it towards the outlet end, the oxygen supply means comprising a plurality of oxygen outlets circumferentially spaced around the fuel supply means and angled radially inwards towards the outlet end and skewed relative to axis X thereby to produce a swirling converging cone of oxygen which intersects the fuel stream in a first upstream zone thereof, the fuel supply means comprising a substantially central outlet having a diverging conical inner surface over which the fuel is passed as it issues therefrom, wherein the divergent inner surface comprises a first divergent conical surface adjacent the central outlet and contiguous to, and at a greater divergent angle from axis X than, a second divergent conical surface.

BRIEF DESCRIPTION OF THE DRAWINGS

FIG. 7b is an end elevation of the burner block of FIG. 7a, and

DETAILED DESCRIPTION OF THE INVENTION

Figure 1:
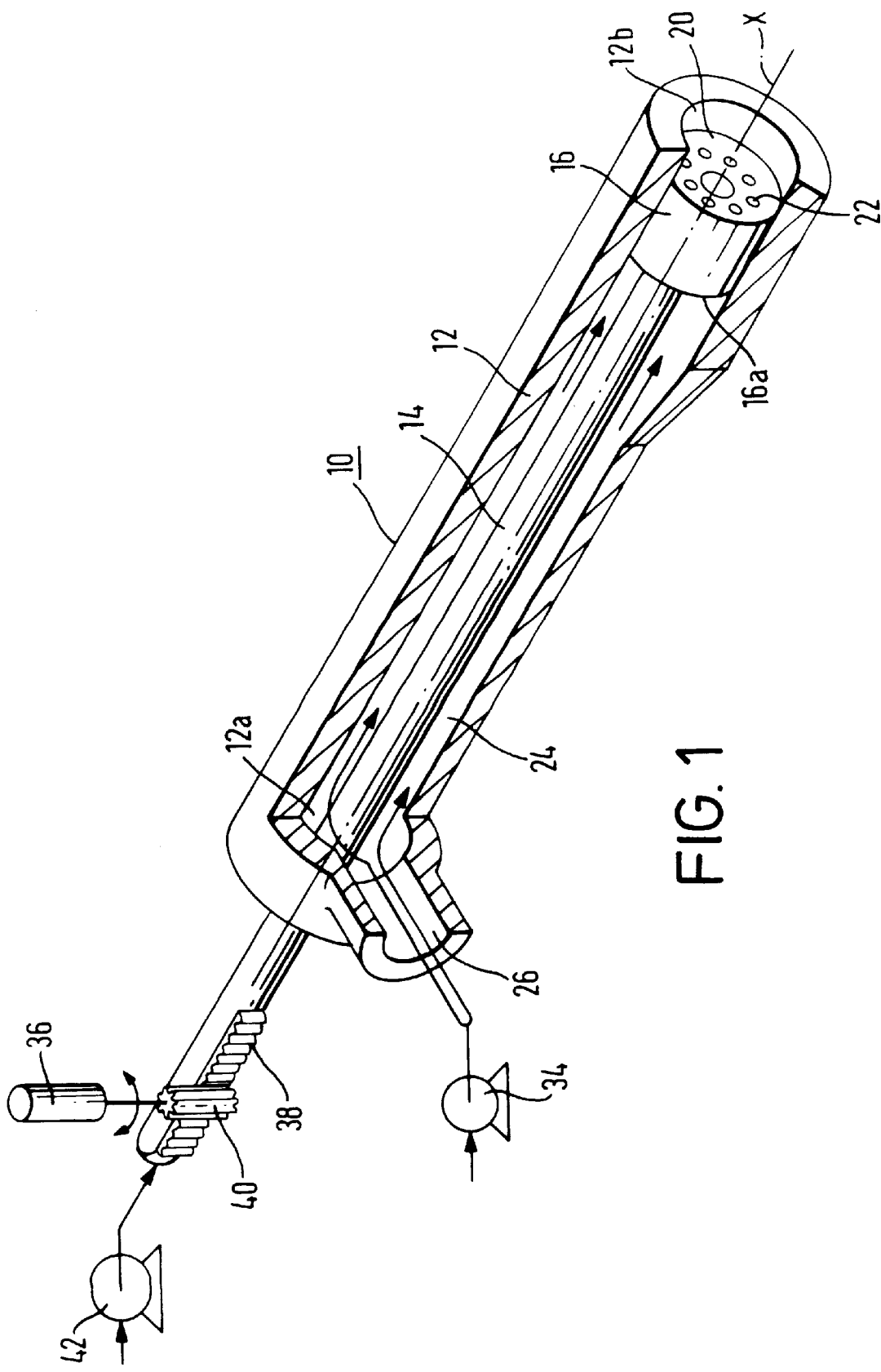
FIG. 1 is a perspective view, partially in section, of an oxygen-fuel embodying the invention.

The burner provided in accordance with the present invention is comprised of an outer jacket comprising a first inlet end, a second outlet end for combustion flame discharge and defining a combustion chamber and a longitudinal axis X; fuel supply means for introducing a stream of atomized fuel into the inlet end and directing it towards the outlet end, and oxygen supply means for introducing oxygen into the inlet end and for directing it towards the outlet end. The oxygen supply means comprises a plurality of oxygen outlets circumferentially spaced around the fuel supply means and angled radially inward toward the outlet end and skewed relative to axis X thereby to produce a swirling converging cone of oxygen which intersects the fuel stream in a first upstream zone thereof, the fuel supply means comprising a substantially central outlet having a diverging conical inner surface over which the fuel is passed as it issues therefrom, wherein the divergent inner surface comprises a first divergent conical surface adjacent the central outlet and contiguous to, and at a greater divergent angle from axis X than, a second divergent conical surface.

With such a "kinked cone" surface, at least some of the liquid fuel issuing from the central outlet travels along the first conical surface before being ejected into the main stream thereof, at the discontinuity point where the first surface meets the second, thereby enhancing mixing of the oxygen and the liquid fuel. By combining the aerodynamic controlled delay of flow mixing and the laminarization of flow with the internal recirculation, i.e. within the flame, of combustion gases and oxidants, such a burner has been found to produce low CO, $NO_x$ and soot emissions and the conical nozzle design significantly reduces the amount of noise from the 120dB characteristic of the prior art. It is very easy to rapidly change the shape of the flame emitted by the burner. Because combustion gases and oxidant are internally recirculated within the flame due to the effect of the swirl, soot formed is burned without residuals in the latter part of the flame. This results in reduced soot formation and a very luminous flame.

The burner provided in accordance with the present invention generates a flame having two regions of combustion: the first, adjacent the fuel outlet, being a fuel-rich zone and the second, later zone where the main combustion takes place and where the majority of the heat is generated. This distancing of the main combustion zone from the burner prevents overheating of the burner and adjacent refractories, thereby obviating the need for any water-cooling of the burner. The division of the flame into two regions is known as "staging", the point at which the two regions meet being called the "staging point" (in general, the greater the length of the first zone relative to the second zone the higher the staging, and vice versa). Staging is reduced in inverse proportion to the size of the fuel and/or oxygen outlets.

The first conical surface may be at an angle $\beta$ between 15 and 30 degrees to the second conical angle or, more preferably, between 20 and 25 degrees. Variation of angle $\beta$ affects the overall flame length and also increases or decreases the fuel/oxygen mixing, according to the properties of the fuel such as viscosity, density, temperature and so on. Advantageously, the second conical surface diverges at an angle $\emptyset$ of between 30 to 40 degrees relative to axis X. Preferably, angle $\emptyset$ is between 30 and 35 degrees.

Preferably, the oxygen supply outlets are angled radially inwardly at an angle $\alpha$ of between 5 to 10 degrees relative to axis X. Also preferably, the oxygen supply outlets are skewed at an angle of $\Theta$ of between 20 to 30 degrees relative to axis X. In general, the greater the shear angle $\Theta$, the greater the overall flame length, and vice versa.

In a particularly advantageous arrangement, the burner includes means for varying the axial position of the fuel and oxygen outlets within the combustion chamber, thereby to vary the discharge pattern of the burner. The fuel and oxygen supply means may, for example, be mounted in a burner plate within the combustion chamber and said burner plate is axially displaceable along axis X thereby to vary the axial to position of the fuel and oxygen outlets within the combustion chamber.

The fuel outlet may comprise a fuel oil outlet, and the oxygen supply means may supply oxygen, air, or oxygen-enriched air. In certain applications, it is advantageous to provide additional air, or oxygen-enriched air, for combustion. This is preferably achieved by providing a plurality of air outlets circumferentially spaced around the oxygen outlets, the air outlets being configured so as to direct a flow of air radially inwardly relative to axis X and skewed relative thereto. The air outlets are preferably skewed in the same direction as the oxygen outlets.

Figure 3:
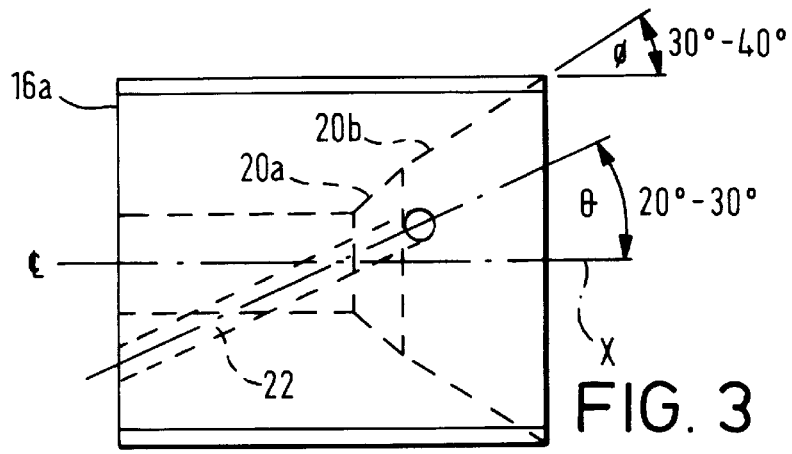
FIG. 3 is a plan view of the burner block taken in the direction of arrow T in FIG. 2.
Figure 4:
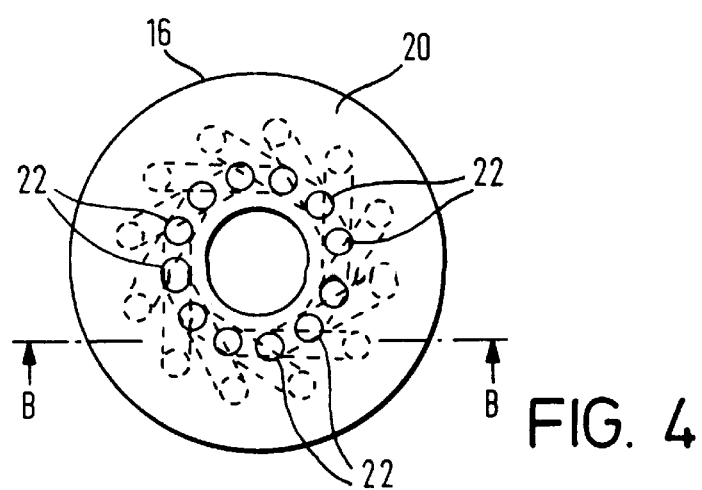
FIG. 4 is an end elevation of the burner block taken in the direction of arrow A of FIG. 2.
Figure 6:
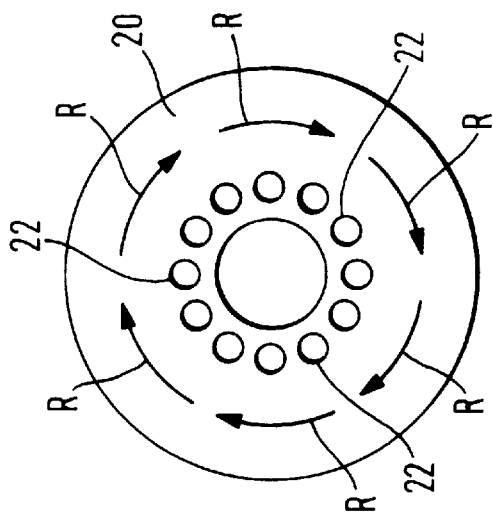
FIG. 6 is an end elevation of the burner block taken in the direction of arrow W in FIG. 5.
Figure 5:
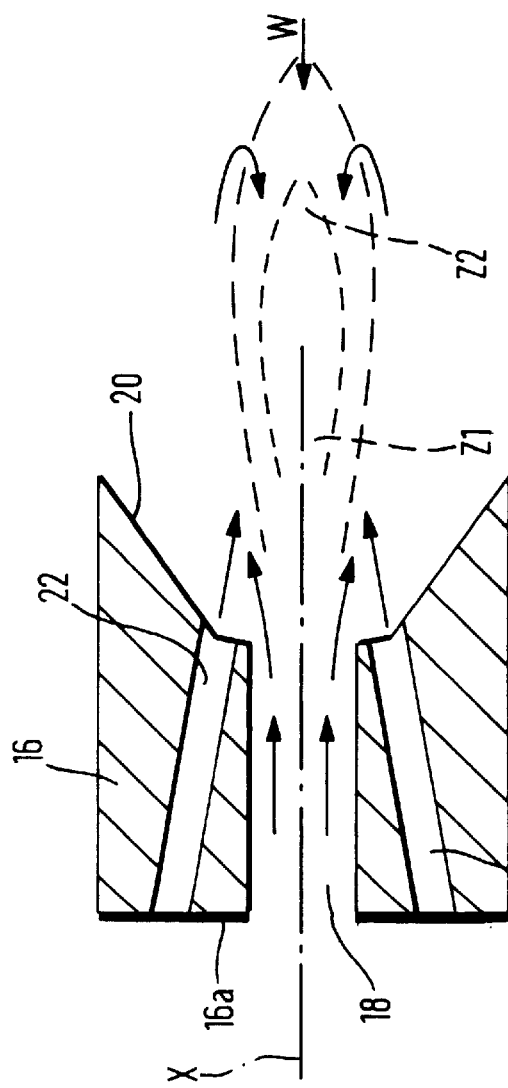
FIG. 5 is a further cross-sectional view of the burner block and illustrates the flow pattern associated therewith.

Referring to the drawings, the oxygen-fuel burner 10 shown by way of example in FIG. 1, comprises a tubular or cylindrical jacket 12 having a first inlet end 12a, a second outlet end 12b for combustion flame discharge and a longitudinal axis X and a central fuel supply pipe 14 extending between the inlet end 12a and outlet end 12b at which point it is coupled to a stainless steel burner block 16 best seen in FIGS. 2 to 6, to which reference is now made. The fuel supply pipe 14 terminates in a substantially central outlet 18 positioned on axis X and having a generally diverging conical inner surface 20 over which the fuel is passed as it issues therefrom. Also provided on the burner block are a plurality of oxygen outlets 22 circumfrentially spaced around the fuel supply outlet 18 and angled radially inwards towards the outlet end 12b and skewed relative to axis X thereby to produce a swirling converging cone of oxygen which intersects the fuel stream in a first upstream zone Z1 as shown in FIG. 5. Referring now once again to FIG. 1, it will be noted that the oxygen supply means further comprises the passage 24 formed between housing 12 and the fuel supply duct 14, oxygen being supplied via inlet 26 and is then directed along duct 24 such that it confronts a rear surface 16a of burner plate 16 at which point the oxygen is passed into the plurality of oxygen supply outlets 22 which each terminate at a point positioned within conical surface 20.

Figure 2:
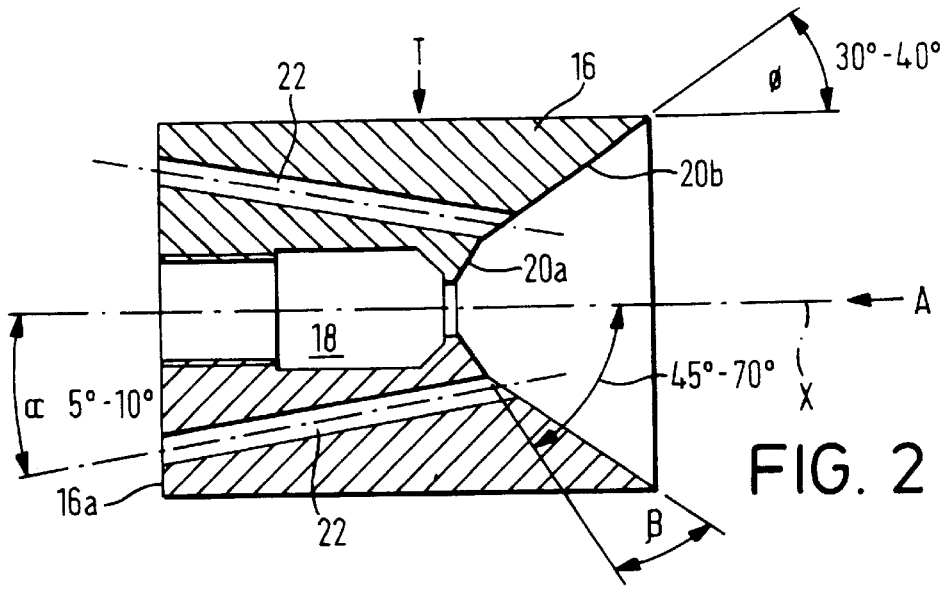
FIG. 2 is a cross sectional view of the burner block illustrated in FIG. 1.

The "generally divergent" conical inner surface 20 in fact comprises two divergent conical surfaces 20a, 20b, as shown in FIG. 2, the upstream surface 20a being at a greater divergent angle to the axis X than the downstream surface 20b (the angle between the two surfaces being denoted $\beta$. In FIG. 2, $\beta$ is approximately 23° and the angle of divergence $\emptyset$ of surface 20b from axis X is about 35°. The conical surfaces 20a, 20b abut along a circle preferably adjacent the oxygen supply outlets 22 (such as along the circumference of the centre points of outlets 22, as shown in the FIGS. In operation, at least some of the liquid fuel streams along the upstream surface 20a before detaching therefrom at its juncture with downstream surface 20b, thereby delaying its introduction into the mainstream of fuel and enhancing mixing thereof with the oxygen.

From FIG. 2 it will be seen that the oxygen outlets 22 are each angled radially inwardly at an angle $\alpha$ of between 5 to 10 degrees relative to axis X which results in any oxygen flow being directed radially inwardly such that it intersects with the flow of fuel exiting outlet 18. From the plan view of FIG. 3 it will be seen that each oxygen outlet 22 is also skewed at an angle $\Theta$ of between 20 and 30 degrees relative to axis X. FIG. 4 illustrates in hidden detail the path of the oxygen supply inlets 22 as they progress from face 16a to surface 20. The angles of the oxygen outlets 22, the diverging conical shape of the nozzle 20 and the velocity ratios between the oxygen and fuel are very important and dictate the amount of emissions and the flame shape. Referring now more particularly to FIGS. 2 to 6, it will be appreciated that the divergence $\emptyset$ of surface 20b at between 30° and 40°, preferably between 30° and 35°, will allow the fuel issuing from outlet 18 to extend in a smooth manner and create a comparatively long, narrow, straight stream having a substantially laminar flow. This is in stark contrast with many of the prior art arrangements in which the fuel is introduced in a manner which is specifically aimed at creating a turbulent flow regime.

The plurality of oxygen ducts 22 being positioned to direct an oxygen stream radially inwards at an angle $\alpha$ of between 5° to 10° relative to axis X is such as to cause delayed mixing of the oxygen into the fuel flow such that zone Z1 is maintained in a substantially fuel rich regime whilst zone Z2 is maintained as a fuel lean region. This arrangement has the advantage of delaying the creation of the luminous region which starts at the position approximately 300 mm to 500 mm away from the burner, thus preventing overheating of the burner and any refractory material adjacent the flame temperature at under 1200° C. and hence water cooling of the burner is not necessary. Higher temperatures can be accommodated if alloys such as INCOALLOY, CuproNickel or Monel 400 are used or water cooling is provided, although water cooling can be dispensed with provided high thermal conductivity and low corrosion material, such as CuproNickel, is used for the entire burner. The fuel rich zone Z1 extends for approximately 300 mm to 500 mm length and terminates at the start of the second, somewhat larger, zone Z2 as shown in FIG. 5, where the main combustion takes place.

The extent of the second zone Z2 can be controlled by varying the angle $\alpha$ and the retraction of the nozzle or burner plate 16 within jacket, or casing, 12, as is known in the art. Whilst it will appreciated that angle α will generally be set for any particular burner design, the position of burner plate 16 can be varied along axis X by actuation of motor 36 (FIG. 1) which in turn moves fuel supply duct 14 and burner plate 16 axially along axis X. The more the burner plate 16 is retracted, the greater the effect that outlet end 12b will have on the flame shape with the swirling effect being reduced as retraction increases. Such swirl reduction results in associated flame length and recirculation changes and, hence, the flame pattern can be altered to suit a particular customer requirement. Clearly, if burner block 16 is positioned such that it terminates flush with outlet end 12b there will be little, if any interference therefrom and the flame shape will be dictated largely by the shape, position and angles of the fuel and oxygen outlets themselves.

Referring now more specifically to FIGS. 3 and 4, it will be appreciated that the oxygen outlets 22 are also skewed at an angle Θ relative to longitudinal axis X thus providing a degree of swirl in the oxygen stream which then rotates in the direction of arrow R around the central fuel flow. An angle Θ of between 20° and 30°, preferably between 20° and 25°, imparts sufficient swirl to cause a recirculation effect to be generated in the combustion zone Z2 such that any remaining undesirable combustion products are recirculated and mixed with any remaining $O_2$ for complete or substantially complete combustion thereof, and consequently there is a significantly reduction in $NO_x$, CO and soot before the flame exits zone Z2.

Referring now briefly once again to FIG. 1, an actuator in the form of motor 36 and rack and pinion arrangements 38, 40 are provided at a distal end of fuel duct 14 and operable to cause said duct and burner plate 16 to move axially along axis X thereby to vary the axial position of the fuel and oxygen outlets 18, 22 within the combustion chamber and, hence, vary the discharge pattern of the burner itself, as is known in the art. Pumps 34 and 42 of FIG. 1 act to deliver the fuel and oxygen into the combustion chamber at a required flow rate and at a velocity ratio sufficient to achieve approximately equal oxygen and fuel velocities at the staging point. In practice, an oxygen:fuel velocity ratio, at their respective outlets, of between 1:1 and 10:1 will give equal velocities at the staging point; in the burner illustrated, a velocity ratio of approximately 2:1 is preferred.

In operation, the present burner reduces the formation of nitrogen oxides by combining delayed mixing of fuel/ oxygen with laminarization of flow and an internal recirculation. Such methods result in "staging", or the generation of two regions Z1, Z2 of combustion: first a very fuel rich zone, of about 300 mm to 500 mm length, second a larger zone where the main combustion takes place. Both zones have their own characteristics with the first, Z1, being of very low temperature and low luminosity, thus preventing the formation of $NO_x$ and the overheating of the burner and/or any refractory material adjacent thereto whilst the adjacent zone Z2 is somewhat hotter. As described above, the extent of the second zone Z2 can be controlled by the angle of the oxygen ports and the retraction of the nozzle burner plate 16 within the jacket 12. Zone Z2 is very luminous, the main part of the fuel being completely combusted due, at least in part, to a recirculation effect created by the oxygen swirling around the fuel stream. Consequently $NO_x$ generation is thus prevented and soot formed to increase the luminosity is burned without residuals. Additionally, this design of nozzle is capable of markedly noise levels from the 120dB of the prior art.

The radial angle α of the oxygen outlets 22 provides the characteristic delayed mixing and transparent blue, initially low temperature part of the flame and the skew angle Ø provides the characteristic swirl number and the respective internal recirculation with the sooty flame. Variation of angle α affects and thus provides control over flame length and $NO_x$ formation, whilst variation of angle Ø affects width, luminosity and $NO_x$ formation. The fuel outlet 18 is large in diameter relative to conventional burners, and provides, at least in part, the desired velocity ratio between the oxygen and the fuel velocities. The cone angle Ø of between 30° and 40 °, preferably between about 30° and about 35°, provides complete stabilization of the flame for a wide range of flows, i.e. wide "turndown" as well as the reduction in operational noise levels.

Figure 7A:
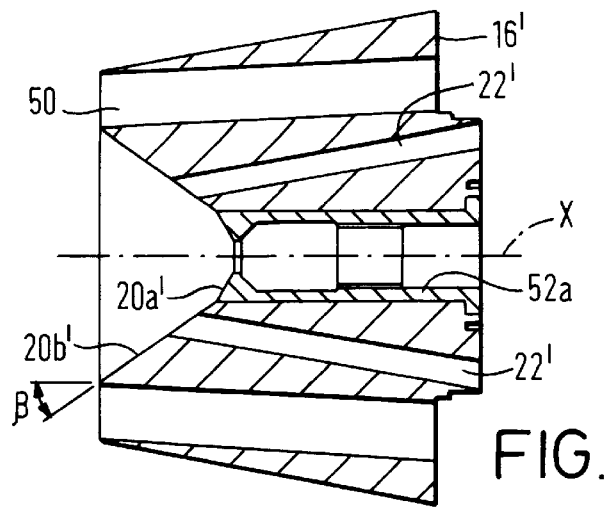
FIG. 7a is a cross-sectional view of a further embodiment of a burner block in accordance with the invention.
Figure 7B:
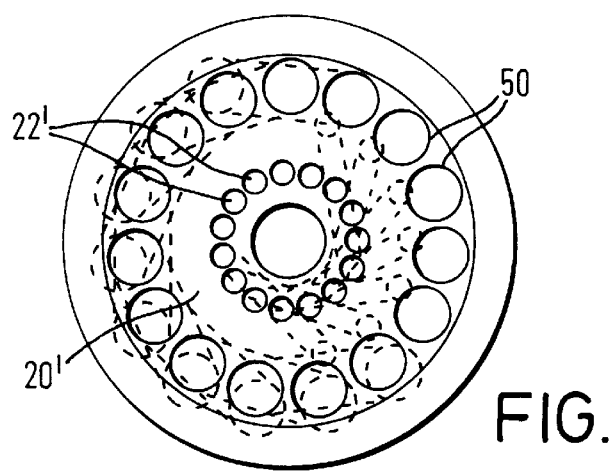
Figure 7C:
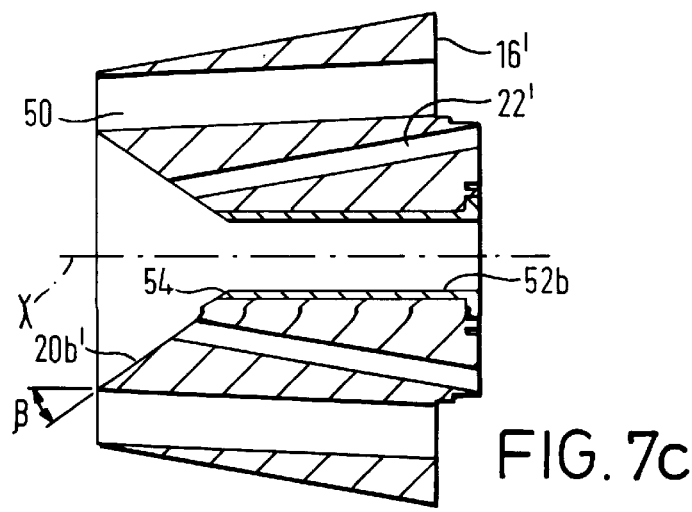
FIG. 7c is a cross-sectional view of the burner block of FIGS. 7a and 7b modified for burning a gaseous fuel.

Referring now to FIGS. 7a to 7c; in which elements identical to those already described are denoted by a prime, a further embodiment of the invention is illustrated. Circumferentially spaced around the oxygen outlets 22' is a plurality of air outlets 50 for supplying air or oxygen-enriched air to the combustion process. Air outlets 50 are angled inwardly relative to axis X, but at an angle somewhat greater than α, so as to converge towards the flame towards the intersection of the first and second zones Z1 and Z2 (see FIG. 5). Air outlets 50 are also skewed in the same direction as oxygen outlets 22' (see FIG. 7b so as to add to the advantageous swirl effect produced by the skewing of the oxygen outlets 22'. It may equally be advantageous, in promoting further turbulence, to skew the air outlets 50 in the opposite direction to the skew of the oxygen outlets 22' (not shown).

In the embodiment of FIG. 7a, the fuel supply means comprises a cap assembly 52a (the front end of which provides the first divergent conical surface 20a') which is coaxial with axis X and releasably mounted within burner block 16'. This is a particularly advantageous arrangement as it permits rapid replacement of cap assembly 52a, for maintenance or repair of to change the angle of the first divergent conical surface which may be desirable when changing the type of fuel supplied to the burner. In FIG. 7c, for example, is shown a cap assembly 52b in which the first divergent conical surface 54 is at the same angle β as is the second surface 20b' relative to axis X; such an arrangement is suitable for the combustion of a gaseous fuel in which there is no need for a discontinuity in the conical inner surface to force the fuel to detach therefrom.

The present invention also provides a method of operating a burner as described above including the steps of: (a) causing fuel to issue from the fuel supply means in a manner which creates a relatively high velocity stream of fuel having a laminar or substantially laminar flow and directing the same for discharge from the second end of the combustion chamber; and (b) causing oxygen to issue from the oxygen supply means in a manner which creates a relatively low velocity stream of oxygen which converges on and rotates around the longitudinal axis X thereby to intersect with the fuel stream in a first upstream zone thereof and create a fuel rich region thereat and introducing any remaining oxygen into a downstream zone of the fuel flow in a manner which creates a fuel lean region thereof.

As is known in the art, means are provided for varying the flows of fuel, oxygen and air into, and hence out of, the burner in order finely to adjust the combustion process for a particular application. Most preferably, the burner is operated such that the velocities of the fuel and oxygen at the staging point are approximately equal, so as to enhance mixing and thus optimize combustion (and minimize emissions), and/or vary the overall flame shape/length. This may be achieved by varying the oxygen and fuel velocity ratio at the outlets of the burner to between 1:1 and about 10:1, advantageously to about 2:1.

Conventional burners normally produce a long, "lazy" flame when supplied with 21 mol % oxygen, i.e. air, and a turbulent, intense short flame at 100% oxygen. In tests it has been found that the burner provided in accordance with the present invention maintains substantially constant flame characteristics over the entire range of oxygen enrichment levels, especially flame length and width, The only discernible changes over the range of oxygen enrichment being in flame temperature and luminosity.

In addition to other advantages mentioned above, a burner in accordance with the invention is particularly suitable in non-ferrous and ferrous melting and smelting applications such as glass manufacturing, and for use in steelmaking generally and in electric arc furnaces in particular.

I claim:

1. A burner for combusting oxygen and a liquid fuel, the burner having an outer jacket comprising a first inlet end, a second outlet end for combustion flame discharge and defining a combustion chamber and a longitudinal axis X; fuel supply means for introducing a stream of atomized liquid fuel into the inlet end and directing it towards the outlet end, and oxygen supply means for introducing oxygen into the inlet end and for directing it towards the outlet end, the oxygen supply means comprising a plurality of oxygen outlets circumferentially spaced around the fuel supply means and angled radially inwards towards the outlet end and skewed relative to axis X thereby to produce a swirling converging cone of oxygen which intersects the liquid fuel stream in a first upstream zone thereof, the fuel supply means comprising a substantially central outlet having a diverging conical inner surface over which the liquid fuel is passed as it issues therefrom, wherein the divergent inner surface comprises a first divergent conical surface adjacent the central outlet and contiguous to, and at a greater divergent angle from axis X than, a second divergent conical surface so that a portion of the liquid fuel detaches from the first divergent conical surface at the intersection between said first and second divergent conical surfaces thereby to produce a liquid fuel stream having a substantially laminar flow.

2. A burner in accordance with claim 1, wherein the first divergent conical surface is at an angle β of between 15 and 30 degrees to the second divergent conical surface.

3. A burner in accordance with claim 2, wherein the first divergent conical surface is at an angle β of between 20 and 25 degrees to the second divergent conical surface.

4. A burner in accordance with claim 1, wherein the second divergent conical surface diverges at an angle Ø of between 30 to 40 degrees relative to axis X.

5. A burner in accordance with claim 4, wherein angle Ø is between 30 and 35 degrees.

6. A burner in accordance with claim 1, wherein the oxygen supply outlets are angled radially inwards at an angle α of between 5 to 10 degrees relative to axis X.

7. A burner in accordance with claim 1, wherein the oxygen supply outlets are skewed at an angle Θ of between 20 to 30 degrees relative to axis X.

8. A burner in accordance with claim 1, wherein the fuel and oxygen supply means are mounted in a burner plate within the combustion chamber and said burner plate is axially displaceable along axis X thereby to vary the axial position of the fuel and oxygen outlets within the combustion chamber.

9. A burner in accordance with claim 8, wherein the central fuel outlet and the first divergent conical surface form part of a unitary element which is releasably mountable to the burner plate.

10. A burner in accordance with claim 1 further comprising means for discharging air from the outlet end in the direction of combustion flame discharge.

11. A burner in accordance with claim 10, wherein the air discharge means comprises a plurality of air outlets circumferentially spaced around the oxygen outlets.

12. A burner in accordance with claim 11, wherein the air outlets are angled radially inwards relative to axis X.

13. A burner in accordance with claim 11, wherein the air outlets are skewed relative to axis X.

14. A burner in accordance with claim 13, wherein the air outlets are skewed about axis X in the same direction as the oxygen outlets.

15. A burner in accordance with claim 10 further comprising means for varying the flow rate at which air is supplied to, and discharged from, the burner.

16. A burner in accordance with claim 1 further comprising means for varying the flow rate at which the oxygen and/or the fuel are supplied to, and discharged from, the burner.

17. A method of operating a burner in accordance with claim 1 including the steps of:

(a) causing fuel to issue from the fuel supply means in a manner which creates a relatively high velocity stream of fuel having a laminar or substantially laminar flow and directing the same for discharge from the second end of the combustion chamber; and (b) causing oxygen to issue from the oxygen supply means in a manner which creates a relatively low velocity stream of oxygen which converges on and rotates around the longitudinal axis X thereby to intersect with the fuel stream in a first upstream zone thereof and create a fuel rich region thereat and introducing any remaining oxygen into a downstream zone of the fuel flow in a manner which creates a fuel lean region thereof.

18. A method in accordance with claim 17 comprising causing the fuel and oxygen to issue from their respective outlets with a velocity ratio such that their velocities at the point where the first and second zones meet are approximately equal.

19. A method in accordance with claim 18, wherein the said velocity ratio is between 1:1 and 10:1.

20. A method in accordance with claim 19, wherein the said velocity ratio is about 2:1.

* * * * *